Dec. 9, 1930.  H. TIMM  1,784,209
POTATO GATHERER FOR POTATO DIGGERS
Filed Aug. 18, 1926  2 Sheets-Sheet 2

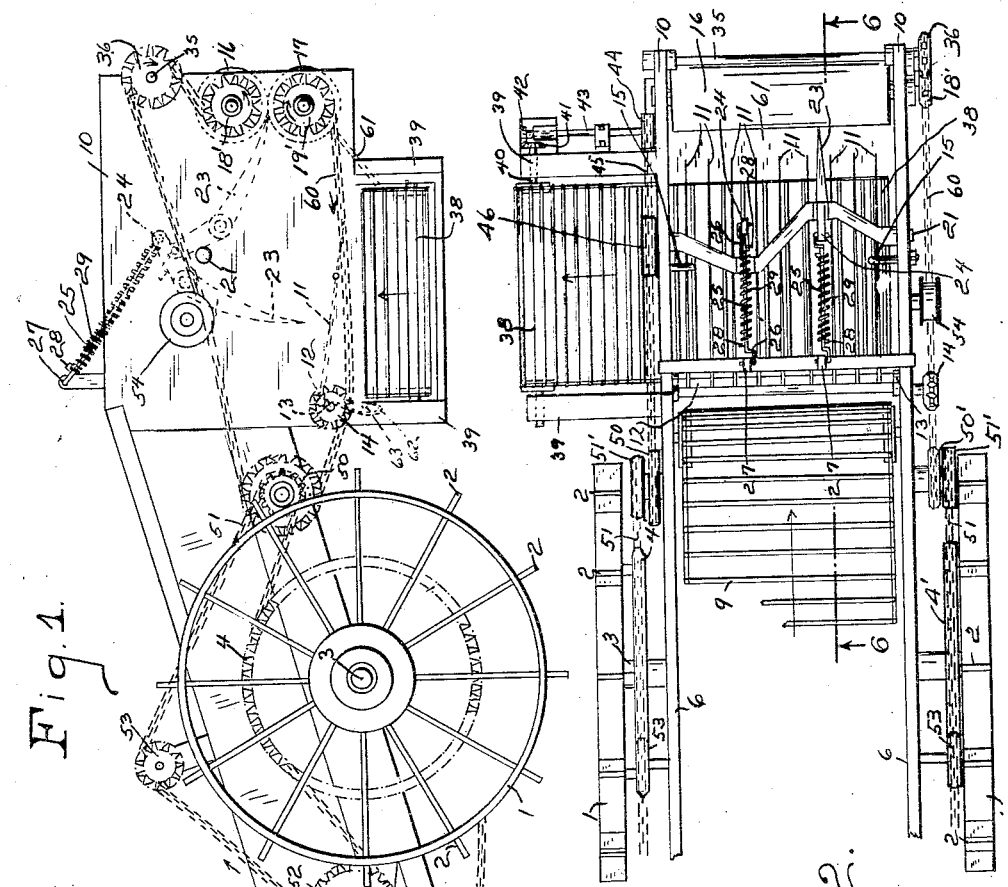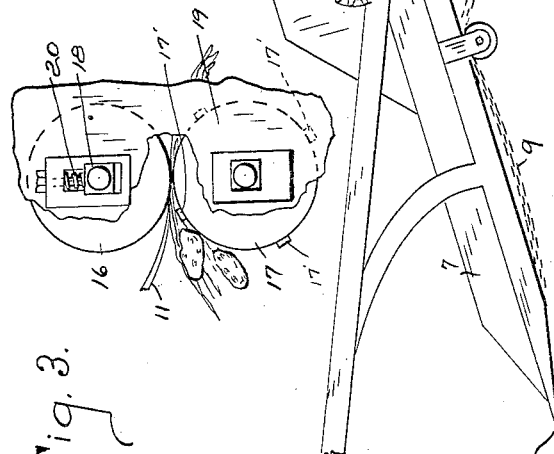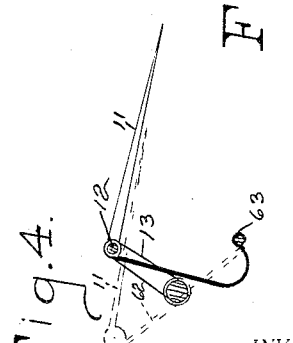

INVENTOR.
Henry Timm
BY
Erwin, Wheeler & Woolard
ATTORNEY.

Patented Dec. 9, 1930

1,784,209

UNITED STATES PATENT OFFICE

HENRY TIMM, OF SAXEVILLE, WISCONSIN

POTATO GATHERER FOR POTATO DIGGERS

Application filed August 18, 1926. Serial No. 129,927.

This invention relates to improvements in potato gatherers and is particularly directed to mechanism for separating potatoes from their vines when received from a potato digger.

It is an object of this invention to provide for a potato digger, mechanism for receiving potatoes and their vines when removed from the ground and for successfully separating from their vines the potatoes so received.

It is also an object to provide mechanism for delivering the potatoes at a position relative to the potato digger and remote from the position at which the vines are delivered.

In the drawings:

Fig. 1 is a side elevation of a potato digger showing the potato gathering mechanism.

Fig. 2 is a fragmentary plan view of the potato digger and gathering mechanism shown in Fig. 1.

Fig. 3 is a fragmentary enlarged view of a portion of the separating mechanism.

Fig. 4 is an enlarged fragmentary view of a portion of the separating mechanism.

Like parts are identified by the same reference characters throughout the several views.

Figure 5:
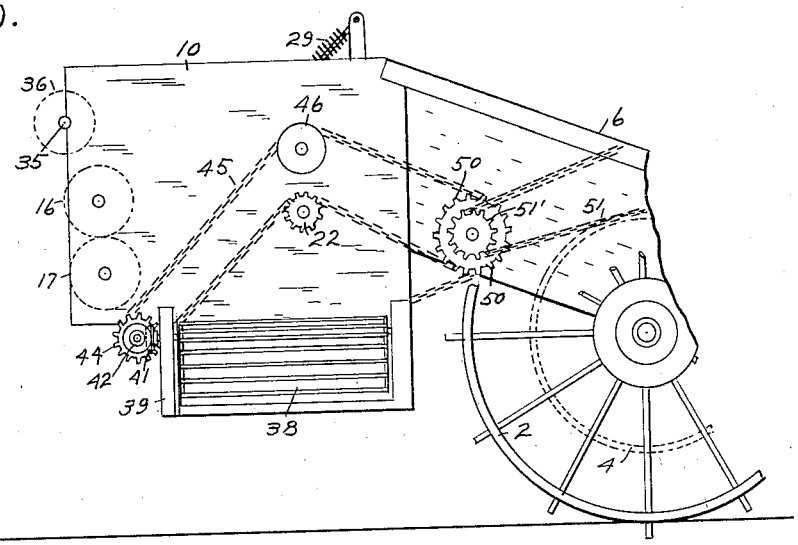
Fig. 5 is a fragmentary side elevation of the potato gatherer, such elevation being opposite to that shown in Fig. 1.
Figure 6:
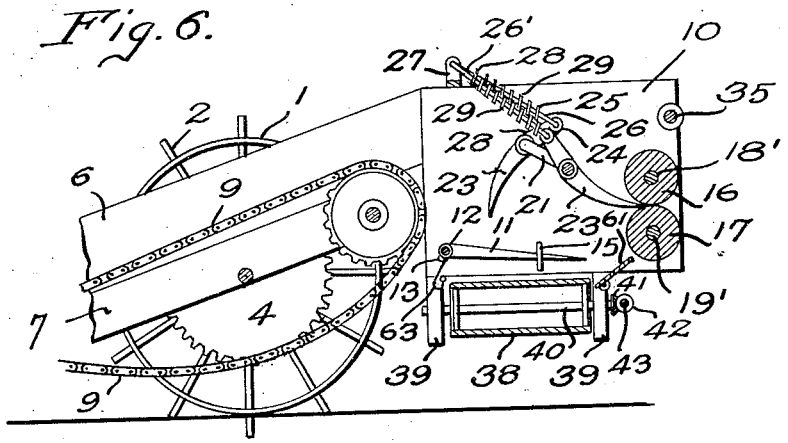
Figure 6 is a longitudinal sectional view drawn to line 6—6 of Figure 2.

My potato gatherer may be attached to any ordinary potato digger of the general type shown in the drawings, in which a pair of bull wheels 1, with ground gripping lugs 2, support an axle 3 provided with conveyor driving sprockets 4 and 4'. The axle also supports a frame 5 having side walls 6 and 7 and a shovel 8 at the lower end, which lifts the potatoes and delivers them upon an elevator or incline endless conveyor 9 driven from the sprockets 4—4' through chains 51 and sprockets 51'. These parts being of ordinary construction, detailed illustration and description is deemed unnecessary.

Supported from the frame 5 at its rear end and between a pair of spaced side walls 10, I employ a shaking raddle or vine separating rack which constitutes an extension of the elevating conveyor 9 and comprises spaced longitudinally extending bars preferably having the form of tines 11, secured to a crank at the receiving end of the raddle. The crank comprises a rod 12 supported transversely of the conveyor 9 at and somewhat below its rear end by a pair of crank arms 13, one of which is secured to the sprocket wheel 14 and the other one being mounted upon a stud shaft aligned with the axis of said sprocket wheel at the opposite side of the rack.

Thus rotation of the sprocket wheel 14 will carry the rod 12 and the receiving ends of the rack in a circular path about the axis of the sprocket wheel. The tines are rigidly secured to the rod 12 and the end tines of the series are supported by eye bolts 15 from the side walls 10 whereby all of the tines will reciprocate with a rocking motion, with the end tines sliding in the bearings provided by the eye bolts. The tines being unconnected with each other except by the crank, potato vines may freely move toward and beyond their rear or free ends.

Disposed above the tines 11 and at the free end thereof is a pair of rolls 16 and 17 each provided with bearing members in the side walls 10. The upper roll 16 is provided with vertically movable bearings 18 resiliently urged toward the bearings 19 of the roll 17 by a pair of springs 20. The rolls 16 and 17 are each provided with a shaft extending through their respective bearings and having thereon sprockets 18' and 19'.

Disposed above the tines 11 and spaced therefrom, is a crank shaft 21 provided with bearings in the side walls 10. One of the ends of the crank shafts 21 extends through a side wall 10 and is provided with a sprocket 22. Carried by the crank shaft 21 is a pair of picker teeth 23 each pivotally mounted intermediate their ends upon the crank shaft 21. The upper ends or short arms 24 of the picker teeth are each connected with the frame or sides of the potato digger by resiliently extensible rods 25. The resiliently extensible rods 25 each comprise a pair of parallel members 26 and 26' adapted to slide axially upon each other. The member 26 is pivotally connected with the arms 24 and the member 26' is pivotally connected to the frame at 27. The members 26 and 26' have their free ends hooked at 28 and disposed between these hooked ends there is coiled about the rod members a helical compression spring 29. From the foregoing it will be observed that these extensible arms 25 may be lengthened by moving the members 26 and 26' longitudinally and thereby placing the spring 29 under compression. When the force tending to lengthen the extensible arms 25 is released the spring 29 will cause the members 26 and 26' to move longitudinally of each other and toward their normally retracted position, thus shortening the extensible arms 25.

Rotation of the crank shaft 21 will carry the pivotal axis of each of the arms 23 toward and away from the extensible arms 25. When the axis of each of the picker fingers is moved away from the extensible arms 25, such arms will be caused to lengthen and consequently force the picker fingers to the position shown in Fig. 1 with their free ends disposed between the rolls 16 and 17. When the pivotal axis of one of the picker fingers is moved toward the extensible arms 25, its associated arm member 26 will be caused by the spring to contract to its normal position. The cooperative action of the crank shaft and the resiliently connected link rod members will thus cause the picker fingers to operate successively with a raking action over the raddle tines to lift vines therefrom and present them to the stripping rolls 16 and 17 after which the springs force the picker fingers successively to the position where such fingers are withdrawn from between the rolls and disposed above the tines 11 in a position to descend to a position between adjacent tines. By means of this mechanism just described the picker fingers are caused to travel in an elliptical path thereby to successively move the free ends of the fingers to a position between the rolls, then retract them to a position above the tines 11, then move them downwardly to a position between adjacent tines and subsequently back to a position between the rolls 16 and 17.

Extending transversely of the potato digger and journaled in the sides 10 is a rod 35 having at one end an idler sprocket 36. Rod 35 serves as a brace for the sides 10 as well as a bearing upon which sprocket 36 may rotate.

Disposed below the vine separating rack or tines 11 is a conveyor 38 disposed transversely of the potato digger. This conveyor is supported by a frame 39 secured to the frame of the potato digger. The outer end of the conveyor is provided with a shaft 40 upon which is secured a bevel gear 41 meshing with a bevel gear 42 upon the shaft 43. The shaft 43 is provided with a sprocket 44 having a chain 45 which passes over idler wheel 46, about sprocket 50, and over sprocket 22 on the crank shaft 21. The sprocket 50 is connected with the sprocket 51 in any suitable manner to be driven therefrom. As clearly shown in Fig. 5, the conveyor 38 and crank shaft 21 will be operated from the sprocket 50 by means of chain 45.

The conveyor or elevator 9 may be operated from either sprocket 51' which is driven from a sprocket 4 by a chain 51. The chain 51 passes about the sprocket 51', over sprocket 4, about the sprocket 52 carried by the frame and over idler sprocket 53 carried by the frame.

The tines 11 and the rollers 16 and 17 are operated by a chain 60 which passes reversely about sprockets 16 and 17, beneath sprocket 14, about sprocket 50', beneath idler wheel 54 and about sprocket 36. Thus when the potato digger is being moved along the ground the wheels 1 will cause the sprocket 4' to rotate which in turn will impart movement to the chain 60 through sprockets 51' and 50' and thereby operate the rolls and tines as indicated.

When the potato digger is being used to dig potatoes the shovel 8 will remove the potatoes from the ground and the elevator or conveyor 9 will transport the potatoes and their vines from the shovel 8 to the upper end of the conveyor and there deposit the vines and potatoes upon the vine separating rack or tines 11. The oscillation and reciprocation of the tines 11 will cause a considerable number of the potatoes to separate from their vines and drop to the conveyor 38 to be deposited thereby laterally of the potato digger. The oscillatory movement of the picker fingers 23 will feed the vines to the rolls 16 and 17 which, by reason of their frictional engagement will pull the vines through the rolls. Any potatoes remaining upon the vines will be pinched therefrom by the rolls 16 and 17. Such potatoes will drop to the inclined member 61 and be thereby directed to the conveyor 38 which will in turn deposit such potatoes at a position laterally of the potato digger. The vines will be deposited by the rolls immediately at the rear of the potato digger as it advances in its potato digging operation.

I also prefer to provide upon the revoluble rod 12 an apron 62 attached to the frame of the machine by a rod 63. The rod 12 in revolving about the axis of sprocket 14 will permit the apron 62 to hang loosely at times. In this position the apron will catch some of the potatoes which will be thrown therefrom by the apron when it is flattened to its position shown in dotted lines in Fig. 4.

Attention is also called to the fact that one of the rolls, as roll 17, may be provided with a roughened face such as in the case illustrated in Fig. 3 where the roll 17 is provided with cross bars 17'. These bars are provided for the purpose of periodically gripping the potato vines between the rolls to insure continuous feeding of vines.

The foregoing described apparatus is adapted to most effectively remove all of the potatoes from their vines. The device is not complicated in structure and may be easily embodied in the ordinary potato diggers such as are ordinarily found upon the market. No extensive alterations are necessary when applying this invention to an ordinary potato digger.

I claim:—

1. In a potato digger, mechanism for separating potatoes from their vines, said mechanism including a rack having a receiving end and a discharge end, a pair of stripping rolls disposed at said discharge end, and picker fingers supported for movement in an elliptical path having one portion thereof adjacent said rolls, and means for operating said rolls and fingers.

2. In a potato digger, mechanism for separating potatoes from their vines, said mechanism including a frame, a rack having a receiving end and a discharge end, a pair of stripping rolls disposed at said discharge end, a crank shaft journaled in said frame, a picker finger pivotally mounted on said crank shaft for movement about a path described by the shaft, said finger being pivotally mounted intermediate its ends, one end being resiliently connected with said frame, whereby the other end of said finger will describe an elliptical path one portion of which lies closely adjacent said rolls, and means for operating said rolls and crank shaft.

3. In a potato digger, mechanism for separating potatoes from their vines, said mechanism including a frame, a rack having a receiving end and a discharge end, a pair of stripping rolls disposed at said discharge end, a crank shaft journaled in said frame, a picker finger pivotally mounted intermediate its ends on said crank shaft, said pivotal mounting being moved in a circular path described by said shaft, means for rotating said shaft and rolls, and resilient means connecting one end of said finger with said frame, said resilient means comprising an extensible rod and a spring normally maintaining said rod against extension, whereby said finger will describe a path having one portion thereof closely adjacent the interacting surfaces of said rolls.

4. In a potato digger, mechanism for separating potoatoes from their vines, said mechanism including a frame, a rack having a receiving end and a discharge end, a pair of stripping rolls disposed at said discharge end, a crank shaft journaled in said frame, a picker finger pivotally mounted intermediate its ends on said crank shaft, said pivotal mounting being moved in a circular path described by said shaft, means for rotating said shaft and rolls, and resilient means connecting one end of said finger with said frame, said resilient means comprising an extensible rod and a spring normally maintaining said rod against extension, whereby said finger will describe a path having one portion thereof closely adjacent the interacting surfaces of said rolls, said rack being movably supported by said frame.

5. In a potato digger, mechanism for separating potatoes from their vines, said mechanism including a rack having a receiving end and a discharge end, a pair of stripping rolls disposed at said discharge end, picker fingers for feeding to said rolls vines upon the rack, said fingers being mounted for movement in a path having one portion thereof in closely adjacent relation to the interacting surfaces of said rolls.

6. In a potato digger provided with an elevating conveyor; mechanism for separating vines from their potatoes, said mechanism including a frame, a rack mounted in said frame for reciprocatory oscillatory motion and having a receiving end adjacent said conveyor and a discharge end, a pair of stripping rolls disposed at said discharge end, a crank shaft rotatably mounted in said frame above said rack, a picker finger pivotally mounted intermediate its ends on said crank shaft, said pivotal mounting being movable in a circular path described by said shaft, means for rotating said shaft and rolls and for moving said rack, and resilient means connecting one end of said finger with said frame, whereby said finger will describe an elliptical path adjacent said rack and having one portion closely adjacent said rolls.

7. In a potato digger, mechanism for separating potatoes from their vines, said mechanism including a rack having a receiving end and a discharge end, a pair of stripping rolls disposed at said discharge end, a crank vertically above said rack, a picker finger pivotally mounted on said crank, resilient means controlling one end of said picker finger, and means for rotating said crank, whereby said finger will describe a path adjacent said rack and having one portion closely adjacent the interacting surfaces of said rolls.

8. In a potato digger and conveyor for receiving and conveying the potatoes and their vines in one direction, vine picking means for separating the vines from the free potatoes and actuating them in another direction, in combination with means for receiving such vines and separating attached potatoes therefrom.

9. In a potato digger the combination with a conveyor for the potatoes and their vines, of means, extending transversely of the conveyor, for removing the vines from the free potatoes and presenting them to separating rollers, and a pair of separating rollers at the end of the conveyor in a position to receive the vines and strip the attached potatoes therefrom.

10. In a potato digger, mechanism for separating potatoes from their vines, said mechanism including a rack having one end positioned to receive the potatoes and vines lifted by the digger, a pair of transversely disposed stripping rolls located beyond and slightly above the other end of the rack, a transversely movable potato conveyor underneath the rack, and means for feeding vines from the rack to the rolls, said rack being adapted to allow free potatoes to drop through it to the potato conveyor.

11. In a potato digger having an elevating conveyor, the combination with such conveyor of an oscillatory rack-like extension adapted to receive material elevated by the conveyor and allow free potatoes to drop therethrough, a set of separating rolls disposed along one margin of said extension, means for positively feeding vines from said extension to said stripping rolls, said rolls being disposed to allow the potatoes which they separate from the vines to drop to and through said extension, and means for actuating the rolls to remove the vines.

12. In a potato digger provided with an elevating conveyor for the potatoes and vines, the combination with such elevator of an oscillatory initial separator positioned to receive the material from the conveyor, means for stripping potatoes from the vines, and means for lifting vines from the separator to the stripping means, said stripping means being adapted to deliver the vines in one direction, and said potato digger also having means for conveying the free potatoes in another direction.

HENRY TIMM.